(12) United States Patent
Gas et al.

(10) Patent No.: US 7,886,562 B2
(45) Date of Patent: Feb. 15, 2011

(54) METHOD FOR THE PRODUCTION OF GLASS THREADS COATED WITH A THERMOFUSIBLE SIZE AND PRODUCTS RESULTING THEREFROM

(75) Inventors: Bruno Gas, Chambery (FR); Herve Bourgeoisat, Viviers du Lac (FR); Yvan Besson, Mery (FR); Daniel Richard, Sainte Helene du Lac (FR)

(73) Assignee: Saint-Gobain Technical fabrics Europe, Chambery (FR)

( * ) Notice: Subject to any disclaimer, the term of this patent is extended or adjusted under 35 U.S.C. 154(b) by 1055 days.

(21) Appl. No.: 10/548,956

(22) PCT Filed: Mar. 17, 2004

(86) PCT No.: PCT/FR2004/000646

§ 371 (c)(1),
(2), (4) Date: Sep. 15, 2005

(87) PCT Pub. No.: WO2004/085331

PCT Pub. Date: Oct. 7, 2004

(65) Prior Publication Data

US 2006/0248926 A1    Nov. 9, 2006

(30) Foreign Application Priority Data

Mar. 21, 2003   (FR) .................................. 03 03685

(51) Int. Cl.
C03C 25/00   (2006.01)
C03C 25/24   (2006.01)
C03C 25/36   (2006.01)
C03C 25/48   (2006.01)

(52) U.S. Cl. ............................. 65/447; 65/430; 65/432; 65/443; 65/475

(58) Field of Classification Search .................. 65/447, 65/475, 430, 432, 443, 448

See application file for complete search history.

(56) References Cited

U.S. PATENT DOCUMENTS

| | | | | |
|---|---|---|---|---|
| 3,708,271 A | * | 1/1973 | Loewenstein et al. | .......... 65/512 |
| 3,773,546 A | * | 11/1973 | Marzocchi | ................... 523/435 |
| 4,456,727 A | * | 6/1984 | Middlebrook | ............... 524/511 |
| 4,853,460 A | * | 8/1989 | Harman | ................... 528/339.3 |
| 5,182,357 A | * | 1/1993 | Linden | ....................... 528/137 |
| 6,211,280 B1 | | 4/2001 | Schell | |
| 6,322,888 B1 | * | 11/2001 | Moireau et al. | ............. 428/378 |
| 2004/0171763 A1 | * | 9/2004 | Van Geenen et al. | ........ 525/423 |

FOREIGN PATENT DOCUMENTS

WO    98-51633    11/1998

OTHER PUBLICATIONS

Chen et al., "Polyamides derived from piperazine and used for hot-melt adhesives: synthesis and properties", 2002, International Journal of Adhesion & Adhesives, vol. 22, p. 75-79.*

* cited by examiner

Primary Examiner—Matthew J. Daniels
Assistant Examiner—Cynthia Szewczyk
(74) Attorney, Agent, or Firm—Oblon, Spivak, McClelland, Maier & Neustadt, L.L.P.

(57) ABSTRACT

The present invention relates to a process for producing glass strands coated with a hot-melt size, whereby molten glass streams, flowing out of orifices located in the base of one or more bushings, are drawn in the form of one or more sheets of continuous filaments, the filaments are then assembled into one or more strands that are collected on one or more moving supports, this process consisting in depositing a first composition containing a coupling agent on the glass filaments and then in depositing a second composition comprising a hot-melt polymer in the melt state, at the latest during assembly of the filaments into one or more strands. It also relates to the glass strands obtained according to this process and to the composites containing said strands.

17 Claims, No Drawings

METHOD FOR THE PRODUCTION OF GLASS THREADS COATED WITH A THERMOFUSIBLE SIZE AND PRODUCTS RESULTING THEREFROM

The present application is the national stage application of WO 04/085331, the text of which is hereby incorporated by reference and claims priority of the French Application No. 03/03685 filed on Mar. 21, 2003.

CROSS-REFERENCE TO RELATED APPLICATIONS

The present application is a 371 of PCT/FR04/00646 filed Mar. 17, 2004 and claims priority to FR 03/03685 filed Aug. 1, 2008.

The present invention relates to the manufacture of reinforcing strands used in the construction of composites. It relates more precisely to a process for producing glass strands coated with a hot-melt size, and also to the strands obtained and to the composites produced from said strands.

It is known to manufacture glass reinforcing strands from streams of molten glass that flow out of the numerous orifices of a bushing. These strands are drawn into continuous filaments, they are then possibly combined with filaments of another material, before being assembled into strands that are collected, usually in the form of wound packages.

Before they are assembled in the form of strands, the glass filaments pass through a device for coating them with a size or sizing composition. Deposition of the size is essential. Firstly, it allows a strand to be obtained with the filaments protected from abrasion by contact with the various processing members, thereby preventing them from breaking during manufacture and possibly during their use. Secondly, the size allows the strand to be combined with the organic and/or inorganic materials to be reinforced, by making it easier for the strands to be wetted by and impregnated with these materials.

As a general rule, the size increases the adhesion between the glass and the materials to be reinforced, resulting in improved mechanical properties. The size also promotes mutual cohesion of the filaments, thereby resulting in better integrity of the strand, this property being especially desirable in textile applications where the strands must withstand high mechanical stresses during weaving.

The sizing compositions most commonly used are aqueous compositions (with more than 85% water by weight) containing compounds that are capable of crosslinking subsequent to deposition on the filaments, especially under the effect of a heat treatment carried out after the strands have been collected together. Easy to produce and to deposit, these sizing compositions are also very stable and do not cure prematurely, which would make deposition impossible, whether during storage or beneath the bushing.

In order for the strands to be effectively combined with the materials to be reinforced, it is necessary, however, to remove the water, this generally being achieved by drying the wound strand packages in ovens. However, this treatment is not entirely satisfactory because, on the one hand, it is expensive (the investment costs in terms of ovens and the operating costs, in particular those associated with energy consumption, are considerable) and, on the other hand, it causes the components of the size to migrate to the outside of the package, resulting in a strand of variable quality. In the case of composite strands, which combine glass filaments with filaments of a thermoplastic organic material, it may happen that the organic filaments have a change-of-state temperature (for example a glass transition temperature) close to 100° C., which precludes heating these strands to a temperature high enough to remove the water therefrom.

One solution that avoids drying consists in using a hot-melt size based on a thermoplastic polymer which has the property of being liquid when it is heated and of solidifying upon cooling. Such a size, applied hot (at a temperature above its solidification temperature), makes it possible for those filaments to be more or less completely sheathed. The choice of the nature of the polymer depends on the matrix to be reinforced and/or on the organic filaments combined in the composite strand; there is a direct influence on the processability of the strand and on the mechanical performance level of the composite materials produced from these strands.

A drawback of hot-melt polymers lies in their insufficient ability to bond correctly to glass. In the case of composite strands, this results in poor cohesion of the filaments, which tend to group together depending on their nature, hence resulting in segregation that may lead to the formation of loops. In some applications, such as weaving, this strand cannot be used because knots form, which cause the weaving machines to stop.

To remedy this drawback, it proves necessary to add at least one coupling agent to the size deposited on the glass. The coupling agent must have an affinity both for the glass and for the matrix to be reinforced, and possibly for the filaments other than the glass filaments when the strands are composite strands. The coupling agent must also be compatible with the constituents of the size without, however, prematurely reacting with them, which would cause a substantial increase in the viscosity, or even complete gelling, and would make deposition on the glass impossible.

The object of the present invention is to provide a process for producing glass strands sized by compositions that contain at least one coupling agent and a hot-melt polymer, this process preventing premature or inopportune reactions between these constituents and requiring no drying.

This object is achieved by the process according to the invention whereby molten glass streams, flowing out of orifices located in the base of one or more bushings, are drawn in the form of one or more sheets of continuous filaments, the filaments are then assembled into one or more strands that are collected on one or more moving supports, this process consisting in depositing a first composition containing a coupling agent on the glass filaments and then in depositing a second composition comprising a hot-melt polymer in the melt state on said filaments, at the latest during assembly of the filaments into one or more strands.

The process according to the invention has several advantages. It uses a size involving little or no water, which therefore obviates strand drying treatments, and therefore representing a major saving. It improves the bonding of the coupling agent to the glass. Since the coupling agent is applied first, there is thus enough time for it to react with the glass before coming into contact with the hot-melt polymer. Similarly, since the coupling agent is deposited separately, the final amount on the strand may be precisely adjusted. The process limits the loss of the coupling agent by evaporation since the latter is applied at room temperature (that is to say without supplying additional energy) to cooled filaments, and consequently the risk of inhalation of toxic substances by the operators is kept at a very low level and there is a substantial saving (the coupling agent generally representing a substantial portion of the cost of the size).

The process according to the invention, thanks to the advantages that it affords, allows strands to be obtained with a uniform quality over their entire length.

In particular, this simply implemented process offers great freedom in choosing the coupling agent and the hot-melt polymer because they are introduced separately onto the filaments. It thus simplifies the preparation of the sizing compositions, this often being tricky owing to the problems of compatibility and/or homogenization of the constituents, which problems may be accentuated during storage and deposition of the size. Moreover, the process applies with the same advantages to the production of various types of glass-based sized strands as indicated below.

In the present invention, the term "glass strands" is understood to mean glass-based strands, that is to say not only strands formed solely from glass filaments, but also strands formed from glass filaments and filaments of a thermoplastic organic material. In the latter case, while the glass filaments are being drawn, the formed filaments of organic material are extruded from an extrusion head and simultaneously entrained (or the strands of organic material are fed in at the same time from, for example, packages), the paths followed by the glass filaments and the filaments (or strands) of organic material converging on one another before said filaments are assembled into at least one mechanically entrained composite strand.

The glass filaments may be drawn in the form of a sheet from a bushing or in the form of several sheets from one or more bushings and may be assembled into one or more strands. The drawing speed of the glass filaments in the process according to the invention is generally between 6 and 50, preferably 9 and 20, meters per second.

According to the invention, the compositions, in particular the composition containing the coupling agent (first composition), are generally deposited on cooled glass filaments, that is to say those having a temperature not exceeding 90° C., preferably 75° C., in order to avoid any risk of selective evaporation and to allow better control of the amount of material deposited on the filaments. Optionally, the cooling of the filaments may be speeded up by spraying an appropriate fluid, for example by spraying water which evaporates naturally before the coupling agent is deposited, and/or by blowing air.

The first composition containing the coupling agent is deposited while the glass filaments are being drawn, but before they are assembled into strands, so as to prevent them from breaking on the assembling device. Preferably, the first composition is deposited as soon as the filaments have reached the cooling temperature indicated above so as to have the maximum possible time for contact between the glass and the coupling agent. This increases the bonding of the coupling agent before the second composition, which contains the hot-melt polymer, is applied. The application may take place, for example, using a sizing roller, a lipped device or a sprayer. Preferably, a sizing roller is used.

The deposition of the second composition containing the hot-melt polymer takes place after the filaments have been coated with the first composition, and at the latest while the filaments are being assembled into strands. The deposition may be carried out using the same devices as those used for the first composition, these also having to be provided with means for keeping the hot-melt polymer in the melt state. The temperature for applying the hot-melt composition is generally less than or equal to 200° C., is preferably less than or equal to 160° C. and better still is greater than 100° C. The temperature is chosen so that the viscosity of the hot-melt composition is low enough for it to be correctly deposited on the glass filaments and for the residual traces of water to be able to be removed. These requirements are satisfied with a viscosity of around 200 to 600 mPa·s, preferably 300 to 500 mPa·s. The aforementioned temperature conditions furthermore reduce the risk of the polymer undergoing thermal degradation that may impair its properties, while nevertheless maintaining a reasonable energy consumption and satisfactory safety conditions for the operators.

The composition applied firstly to the glass filaments comprises one or more coupling agents capable of bonding to the glass and of promoting bonding of the hot-melt polymer deposited subsequently. The coupling agent may be chosen, for example, from organofunctional silanes, especially those containing one or more hydrolysable groups, such as γ-aminopropyltriethoxysilane, γ-glycidoxy-propyltrimethoxysilane, γ-methacryloxypropyltrimethoxysilane, vinyltrimethoxysilane, titanates and zirconates. The preferred coupling agent is γ-aminopropyltriethoxysilane.

The first composition may furthermore include a diluent that helps to dissolve the coupling agent or agents. The optional diluents are essentially water and any organic compound having, where appropriate, at least one particular function in the size, such as filament protection, strand flexibility, etc. Preferably, the composition contains no organic solvent for toxicity and volatile organic compound (VOC) emission reasons. More preferably, the composition contains water in an amount as low as possible but nevertheless sufficient for deposition under acceptable conditions and such that the water, once the composition has been deposited, can evaporate naturally, without supplying further energy.

The coupling agent concentration in the composition depends on the application conditions, especially the speed at which the glass filaments are drawn and on the device used for the deposition. For example, good results are obtained with an aqueous composition comprising at least 5% by weight of coupling agent deposited on the filaments running at a speed of around 9 to 17 meters per second by means of a sizing roller.

The second composition may comprise one or more polymers that can be deposited under the conditions of the process and can resist thermal degradation. The hot-melt polymers may be chosen from polymers that are solid at a temperature below 50° C. and have a viscosity of between 200 and 600 mPa·s, preferably between 300 and 500 mPa·s, at the deposition temperature, which is generally around 100 to 200° C.

The choice of polymer essentially depends on the material to be reinforced. In particular, it is important for the polymer to be compatible with said material when it is desirable for the final composite to have good levels of mechanical performance.

When the strand is a composite strand, the choice also depends on the nature of the thermoplastic filaments used. In particular, it is necessary to ensure that the hot-melt polymer is compatible with these filaments, thereby preventing repulsion effects leading to the filaments bunching together according to their nature (glass or thermoplastic) and therefore being distributed nonuniformly within the strand.

For example, when the thermoplastic filaments essentially consist of one or more polyolefins, such as polyethylene or polypropylene, the hot-melt polymer is a copolymer of ethylene and/or propylene with acrylic acid or maleic anhydride.

When these same filaments essentially consist of one or more thermoplastic polyesters, such as polyethylene terephthalate (PET) or polybutylene terephthalate (PBT), the hot-melt polymer may be an epoxy, for example one belonging to the DGEBA (diglycidyl ether of bisphenyl A) group.

The amount of hot-melt polymer deposited on the glass filaments represents in general 2 to 15%, preferably 3 to 8%, by weight of the glass. Above 15%, the state of solidification of the polymer on the filaments before they are assembled in the form of a strand is not complete, which results in substantial bonding between the filaments. The strand obtained is unusable as it lacks flexibility.

The second composition may furthermore include a diluent for adapting the viscosity to the deposition conditions. This is usually a polymer of a similar nature to the hot-melt polymer, but one that is incapable of reacting with the coupling agent, for example a wax, especially a polyolefin wax.

The compositions deposited on the glass filaments may furthermore include one or more compounds conferring particular properties on the size. These compounds (denoted hereafter by the term additives) may be provided by one or other of the compositions, preferably by the hot-melt composition.

As additives, mention may especially be made of:
lubricants, preferably nonionic lubricants;
antistatic agents;
antioxidants;
UV stabilizers;
nucleating agents;
pigments.

Preferably, the content of agents of each of the aforementioned categories is less than or equal to 1% by weight of the size and advantageously the total content of additives is less than 5%.

The choice of coupling agent and of hot-melt polymer, and also their amounts, depends in particular on the material to be reinforced by the strands according to the invention and on the intended application.

As a general rule, the total amount of the compositions deposited on the glass filaments represents 2 to 15%, preferably 3 to 8%, by weight of the glass.

The glass filaments coated with the size may be combined with filaments of a thermoplastic organic material before being assembled to form one or more composite strands. The combining operation is generally carried out by spraying the thermoplastic filaments into the sheet of glass filaments in order to obtain comingling of the filaments. The spraying may be carried out by any known means for fulfilling this role, for example a Venturi device.

The constituent thermoplastic material of the filaments may be chosen from materials capable of giving filaments, especially by extrusion in a device such as an extrusion head. As examples, mention may be made of polyolefins, such as polyethylene and polypropylene, thermoplastic polyesters, such as polyethylene terephthalate (PET) and polybutylene terephthalate (PBT), polyethers and polyamides, such as nylon-11 and nylon-12.

The strands are generally collected in the form of packages wound onto rotating supports, for example to form bobbins of continuous strands.

They may also be collected on receiving supports moving translationally, allowing a mat of continuous or chopped intermingled strands to be formed. To do this, it is possible to use, for example, a device for spraying the strands toward the collecting surface that is moving transversely to the direction of the sprayed strands, said device also allowing the strands to be drawn and optionally chopped.

The strands obtained according to the invention may thus be in various forms after collection: bobbins of continuous strands (rovings or cakes), chopped strands and assemblies (mats or networks). After conversion, they may be in the form of tapes, braids and fabrics.

The glass filaments forming these strands have a diameter of between 10 and 30 microns, preferably between 14 and 23 microns, and the glass may be any glass known for producing reinforcing strands, for example E-glass, AR (alkali-resistant)-glass, R-glass or S-glass. E- and AR-glasses are preferred.

When the strand consists only of glass, its linear density may vary between 200 and 4000 tex, preferably 640 and 2000 tex.

In the case of composite strands, the glass content may vary from 30 to 85%, preferably 53 to 83%, by weight of the strand.

At room temperature, the strands obtained are coated with a solidified size, the weight content of which is constant over the entire length of the strand.

The strands according to the invention may be combined with various materials to be reinforced, especially with a view to producing composite components having good mechanical properties. The composites are advantageously obtained by combining at least strands according to the present invention with at least one thermoplastic organic material, such as polyolefins, polyvinylchlorides (PVCs) and polyesters.

The glass content in the composites is generally between 20 and 80%, preferably 28 and 60%, by weight.

The following examples will be used to illustrate the invention without, however, limiting it.

EXAMPLE 1

E-glass filaments 18.5 μm in diameter, obtained from streams of glass output by a bushing having 800 orifices, were mechanically drawn at a speed of 14 m/s.

Along their path, they were coated with an aqueous solution containing 16.10 wt % γ-amino propyltriethoxysilane (SILQUEST A 1100, sold by Crompton) in contact with a sizing roller. The ambient temperature around the roller was about 40° C.

The filaments then passed over a second sizing roller placed approximately 30 cm from the first, and heated to 140° C., which delivered a composition containing 70 wt % of an ethylene/acrylic acid copolymer (AC 540, sold by Honeywell) and 30 wt % of polyethylene (AC 617, sold by Honeywell).

Polypropylene filaments extruded from an extrusion head having 600 holes passed through a Venturi device that sprayed them into the sheet of glass filaments after it had passed over the second sizing roller. The intimately mixed glass and polypropylene filaments were then assembled into a single strand, which was wound in the form of a roving.

The strand obtained comprised 60 wt % of glass filaments having a loss on ignition of 4%.

This strand could be easily handled—it was flexible and integral, and had a uniform coating over its entire length and good distribution of the glass filaments and polypropylene filaments within the strand, that is to say substantial comingling of all the filaments. It could also be woven, and the woven fabric obtained could be used to reinforce thermoplastic organic materials, especially polyolefins (PE and PP).

EXAMPLE 2 (COMPARATIVE EXAMPLE)

This example was produced under the same conditions as for Example 1, but modified in that the two compositions were premixed in order to form a single composition, which was deposited on the filaments by means of the heated sizing roller.

The composition obtained had a very high viscosity, making it impossible to be applied to the filaments using a sizing roller.

EXAMPLE 3

E-glass filaments 18.5 μm in diameter, obtained from streams of glass output by a bushing having 800 orifices, were mechanically drawn at a speed of 14 m/s.

Along their path, they were coated with an aqueous solution containing 16.10 wt % γ-amino propyltriethoxysilane (SILQUEST A 1100, sold by Crompton) in contact with a sizing roller. The ambient temperature around the roller was about 40° C.

The filaments then passed over a second sizing roller placed approximately 30 cm from the first, and heated to 140° C., which delivered a DGEBA-type epoxy polymer (DER 671 sold by Dow Chemical).

Polyethylene terephthalate filaments extruded from an extrusion head having 600 holes passed through a Venturi device that sprayed them into the sheet of glass filaments after it had passed over the second sizing roller. The intimately mixed glass and polyethylene terephthalate filaments were then assembled into a single strand, which was wound in the form of a roving.

The strand obtained consisted of 65% glass. It was easy to handle and had properties similar to those of the strand of Example 1.

This strand could be used as reinforcement in PVC, especially for the production of sections for windows.

The invention claimed is:

1. A process for producing sized glass strands, comprising providing molten glass streams, flowing out of orifices located in the base of one or more bushings, and which are drawn in the form of one or more sheets of continuous glass filaments,
   depositing a first composition containing a coupling agent on single glass filaments,
   subsequent to the deposition of first composition, depositing a second composition comprising a hot-melt polymer in the melt state on said single glass filaments,
   assembling the single glass filaments into one or more strands that are collected on one or more moving supports, wherein the second composition is deposited prior to or at the same time as the assembly of the single glass filaments into one or more strands.

2. The process as claimed in claim 1, wherein the first composition is deposited on the single glass filaments cooled to a temperature not exceeding 90° C.

3. The process as claimed in claim 2, wherein the cooling of the single glass filaments is speeded up by spraying a fluid, by spraying water or by blowing air.

4. The process as claimed in claim 1, wherein the coupling agent is at least one selected from the group consisting of organofunctional silanes, organofunctional silanes containing one or more hydrolizable groups, titanates and zirconates.

5. The process as claimed in claim 4, wherein the coupling agent is γ-aminopropyltriethoxysilane.

6. The process as claimed in claim 1, wherein the second composition is deposited at a temperature of less than or equal to 200° C.

7. The process as claimed in claim 1, wherein the viscosity of the second composition is around 200 to 600 mPas at a temperature between 100 and 200° C.

8. The process as claimed in claim 1, wherein the hot-melt polymer is solid at a temperature below 50° C.

9. The process as claimed in claim 1, wherein the single glass filaments are combined with filaments of a thermoplastic organic material before they are assembled in the form of one or more strands.

10. The process as claimed in claim 9, wherein the thermoplastic organic material is at least one selected from the group consisting of polyolefins, thermoplastic polyesters, polyesters and polyamides.

11. The process as claimed in claim 1, wherein the compositions deposited on the strand furthermore include at least one additive selected from the group consisting of lubricants, antistatic agents, antioxidants, UV stabilizers, nucleating agents and pigments.

12. The process as claimed in claim 1, wherein the total amount of the compounds deposited on the single glass filaments represents 2 to 15% by weight of the glass.

13. A glass strand coated with a thermoplastic sizing composition as obtained by the process as claimed in claim 1.

14. A composite comprising at least one thermoplastic organic material and sized glass strands, wherein the composite comprises, at least in part, sized glass strands as claimed in claim 13.

15. The composite as claimed in claim 14, wherein the thermoplastic organic material is at least one selected from the group consisting of polyolefins, polyvinyl chlorides and polyesters.

16. The composite as claimed in claim 14, wherein the composite has a glass content of between 20 and 80%.

17. The process as claimed in claim 1, wherein the viscosity of the second composition is around 300 to 500 mPas at a temperature between 100 and 200° C.

* * * * *